United States Patent
Roeland et al.

(10) Patent No.: US 10,841,402 B2
(45) Date of Patent: Nov. 17, 2020

(54) AGENT-BASED PUBLISHER MOBILITY FOR ICN

(71) Applicant: Telefonaktiebolaget LM Ericsson (publ), Stockholm (SE)

(72) Inventors: Dinand Roeland, Sollentuna (SE); Kim Laraqui, Solna (SE); Hans Eriksson, Sollentuna (SE); Ioanna Pappa, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,427

(22) PCT Filed: Aug. 30, 2016

(86) PCT No.: PCT/SE2016/050813
§ 371 (c)(1),
(2) Date: Feb. 5, 2019

(87) PCT Pub. No.: WO2018/044213
PCT Pub. Date: Mar. 8, 2018

(65) Prior Publication Data
US 2020/0053187 A1 Feb. 13, 2020

(51) Int. Cl.
*H04L 29/08* (2006.01)
(52) U.S. Cl.
CPC ............ *H04L 67/327* (2013.01); *H04L 67/18* (2013.01); *H04L 67/2842* (2013.01)
(58) Field of Classification Search
None
See application file for complete search history.

(56) References Cited

U.S. PATENT DOCUMENTS

2018/0019956 A1* 1/2018 Ravindran ............ H04L 67/327
2018/0146380 A1* 5/2018 Srikanteswara ...... H04W 16/14

FOREIGN PATENT DOCUMENTS

EP 2466786 A1 6/2012
WO 2013010006 A2 1/2013

OTHER PUBLICATIONS

International Search Report and Written Opinion for International Patent Application No. PCT/SE2016/050813, dated Feb. 8, 2017, 10 pages.

* cited by examiner

*Primary Examiner* — Jeffrey R Swearingen
(74) *Attorney, Agent, or Firm* — Withrow & Terranova, PLLC

(57) ABSTRACT

The invention relates to methods and devices for distributing data content in an Information Centric Networking (ICN) network. In an aspect of the invention, there is provided a method performed at a wireless communication device of distributing data content in an ICN network. The method comprises submitting a request to distribute the data content to an agent device in the ICN network assigned to distribute the data content on behalf of the wireless communication device, the request comprising an identifier associated with the wireless communication device, an identifier of the request configured to enable delivery of the request to the agent device via intermediate ICN nodes of the ICN network, and the content to be distributed.

26 Claims, 5 Drawing Sheets ical Field

AGENT-BASED PUBLISHER MOBILITY FOR ICN

This application is a 35 U.S.C. § 371 national phase filing of International Application No. PCT/SE2016/050813, filed Aug. 30, 2016, the disclosure of which is incorporated herein by reference in its entirety.

TECHNICAL FIELD

The invention relates to methods and devices for distributing data content in an Information Centric Networking, ICN, network.

BACKGROUND

Over recent years, Information/Content Centric Networking (ICN/CCN) is gaining momentum as a future technology for 5th generation mobile networks ("5G") and other coming technologies for media distribution, device software upgrades and the Internet of Things (IoT).

Information Centric Networking and Content Centric Networking are sometimes also referred to as Named Data Networking (NDN). In the following, the term ICN will be used to encompass ICN, CCN and NDN technology.

ICN may be utilized for delivery of content to a wireless communications device, commonly referred to as a User Equipment (UE), over e.g. a 3rd Generation Partnership Project (3GPP) network, where the UE may be embodied in the form a smart phone, tablet, laptop, a gaming console, etc., or a so called fixed wireless terminal (FWT) in the form of e.g. a television set, a computer, or a set top box.

In contrast to traditional Internet Protocols (IPs), ICN addresses content objects using globally unique names instead of IP addresses.

FIG. 1 illustrates a general operating principle of prior art ICN content request and delivery. This operating principle assumes that a link used in one direction—e.g. between ICN Node 1 and ICN Node 2 essentially being switches equipped with large caches for transporting content—to send content requests from subscribers is also used in the other direction to send the corresponding content back via ICN Node 1 and ICN Node 2 from a content provider (i.e. a "publisher") to the subscribers. All links in ICN are therefore assumed to allow for bi-directional communication. A request in ICN terminology is commonly referred to as an "interest".

Multicast support is a key feature in ICN when transporting a particular content from a content provider to various subscribers/end users whom have requested content from that particular content provider. Whenever a node which has received content requests from several subscribers over different interfaces (each node being illustrated to comprise four interfaces in FIG. 1) receives requested content available for delivery, the node will deliver the requested content to the subscribers over a respective interface.

With reference to FIG. 1, if both Subscriber 1 and 2 request the same content, e.g. a live video stream, both subscribers will submit a request/interest to ICN Node 1. However, ICN Node 1 will only forward a single request to ICN Node 2 for that video stream, and ICN Node 2 will as a result forward the single request towards the content provider. The content provider will thereafter return a single copy of the requested live stream to ICN Node 2. Likewise, ICN Node 2 will only send one copy of the live stream over its link to ICN Node 1. ICN Node 1 will then replicate the content of the video stream and send it to both Subscriber 1 and 2.

To the contrary, should ICN node 1 already have the requested content in its cache, it will deliver the content to the requesting subscriber(s) without submitting any further upstream request to ICN Node 2.

The routing of interests is helped by the name of a requested piece of content being a structured name (similar to domain names, but with richer syntax). Routing ICN nodes maintain a Forwarding Information Base (FIB) about where, i.e. across which interface, the name or name prefix should be forwarded. The routing ICN nodes along the path of the travelling interest message keep a record of the interest messages they have forwarded (the interface it came from and the content object it was naming) in their Pending Interest Table (PIT), as well as corresponding content in a Content Store (CS).

As can be concluded, when the interest message reaches an ICN node having a copy of the content object, the content object is propagated backwards along the path the interest message took. The backward path is learned from the entries the interest message left in the PIT of the ICN nodes along the path. If there were multiple interests arriving at an ICN node for a content object address by a particular name, the content object is replicated towards each respective interface/direction the interest messages came from. After forwarding a content object matching a pending interest, the ICN nodes delete the corresponding entry in the PIT. When the original endpoint(s) generating the interest message(s) receive the content object, the transaction is considered finalized.

If other interest messages addressing the same content object arrive at a routing ICN node, it does not forward them, just notes them in the PIT along the entry for the named content object, which is referred to as interest aggregation. This way the PIT entries for the same name (i.e. the same content object) may form a tree in the network with receiver of the interests as the leaves. Interest aggregation is particular advantageous in case of a flash crowd event where suddenly thousands of endpoints are requesting the same content, since the source will only be reached by one request for the content, all other requests will be served from the caches of routers along the path towards the source.

As can be concluded, ICN technology provides for an efficient, scalable and flexible approach of delivering information to an end-user.

A problem with the existing ICN technology implemented in wireless communication networks as described hereinabove is that if a node who wishes to distribute content in the ICN network is mobile, e.g. being a UE 103, the distribution may fail. For instance, a "publishing" UE may send a request to the ICN network that a piece of content is to be distributed in the ICN network such that any requesting device may retrieve the published content. However, at this time, the UE may already have moved and cannot be found by the requesting device (i.e. the "subscribers", cf. FIG. 1) for retrieving the requested content.

SUMMARY

An object of the present invention is to solve, or at least mitigate, this problem in the art and thus to provide an improved method of distributing data content in an ICN network.

This object is attained in a first aspect of the invention by a method performed at a wireless communication device of distributing data content in an ICN network. The method comprises submitting a request to distribute the data content to an agent device in the ICN network assigned to distribute the data content on behalf of the wireless communication device, the request comprising an identifier associated with the wireless communication device, an identifier of the request configured to enable delivery of the request to the agent device via intermediate ICN nodes of the ICN network, and the content to be distributed.

This object is attained in a second aspect of the invention by a wireless communication device configured to distribute data content in an ICN network, comprising a processing unit and a memory, said memory containing instructions executable by said processing unit, whereby said wireless communication device is operative to submit a request to distribute the data content to an agent device in the ICN network assigned to distribute the data content on behalf of the wireless communication device, the request comprising an identifier associated with the wireless communication device, an identifier of the request configured to enable delivery of the request to the agent device via intermediate ICN nodes of the ICN network, and the content to be distributed.

This object is attained in a third aspect of the invention by a method performed at an agent device of distributing data content in an ICN network. The method comprises receiving a request to distribute the data content in the ICN network on behalf of a wireless communication device, the request comprising an identifier associated with the wireless communication device, an identifier of the request configured to enable delivery of the request from the wireless communication device to the agent device via intermediate ICN nodes of the ICN network, and the content to be distributed.

This object is attained in a fourth aspect of the invention by an agent device configured to distribute data content in an ICN network, comprising a processing unit and a memory, said memory containing instructions executable by said processing unit, whereby said agent device is operative to receive a request to distribute the data content in the ICN network on behalf of a wireless communication device, the request comprising an identifier associated with the wireless communication device, an identifier of the request configured to enable delivery of the request from the wireless communication device to the agent device via intermediate ICN nodes of the ICN network, and the content to be distributed.

Advantageously, the mobile communication device informs its agent device that it wishes to publish content in the ICN network, i.e. to make the content available for other requesting devices. The mobile communication device sends the content to the agent device, and the agent publishes the content on behalf of the wireless communication device. The name used by the agent to represent the content does not change, so other devices can simply request this content using existing ICN mechanisms. In other words, ICN Interests for the content sent by the requesting devices end up at the agent device, and the agent device replies by sending the requested content. The wireless communication device does not itself deliver the content to the requesting devices. Hence, the wireless communication device may have moved along, but the requested content will still be delivered to the requesting devices.

In an embodiment, the request to distribute data is configured to be an available ICN Interest message or a new specific ICN distribution message.

In another embodiment, the request further comprises an identifier of the data content.

In an embodiment, the identifier of the request is configured to be an identifier not currently stored in any one of the intermediate ICN nodes, or a flag accompanying the request indicating that the request should be forwarded by the intermediate ICN nodes to the agent device.

In still another embodiment, an acknowledgement is received from the agent device that the request has been received.

In yet another embodiment, in case no acknowledgement is received from the agent device that the request has been received, the request is re-submitted with a new identifier of the request configured to enable delivery of the request to the agent device via the intermediate ICN nodes of the ICN network, and the content to be distributed.

In still a further embodiment, the submitted request is configured with a value indicating a time period for which the submitted request is valid, thereby facilitating for the intermediate ICN nodes in the ICN network to remove the request from their Pending Interest Table (PIT) upon expiry of the time period.

In another embodiment, the submitted request is configured with a value indicating a time period for which the content is valid, thereby facilitating for any of the intermediate ICN nodes in the ICN network to discard the content upon expiry of the time period.

In still a further embodiment, the agent device verifies authenticity of the received request, and extracts the content received with the request.

In still an embodiment, the agent device receives a request from at least one further device to access the data content received by the agent device from the wireless communication device, the request indicating the identifier associated with the wireless communication device and the content identifier, and distributes the requested content to said at least one further device.

In an embodiment, the agent device indicates, with the distributed data content, a time period for which the distributed data content is valid, thereby facilitating for any of the intermediate ICN nodes in the ICN network to discard the content upon expiry of the time period.

In a further embodiment, the agent device submits an acknowledgement to the wireless communication device that the request to distribute the data content has been received.

In an embodiment, in case the content to be distributed is not included with the request sent from the wireless communication device to the agent device, the agent device sends a request for the data content to be distributed, the request comprising an identifier configured to enable delivery of the request from the agent device to the wireless communication device via the intermediate ICN nodes of the ICN network, in reply to which the wireless communication device submits, to the agent device, the data content to be distributed.

In a further embodiment, the wireless communication device verifies authenticity of the received request before submitting the data content to be distributed to the agent device.

In still another embodiment, in case the wireless communication device moves from the location indicated with the request to distribute the data content before the data content indicated in the request has been submitted to the agent device, the request to distribute data content is re-submitted with an updated current location and a new request identifier configured to enable delivery of the request to the agent device via the intermediate ICN nodes of the ICN network.

These and further embodiments of the invention will be discussed in more detail in the detailed description in the following with reference made to the accompanying drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
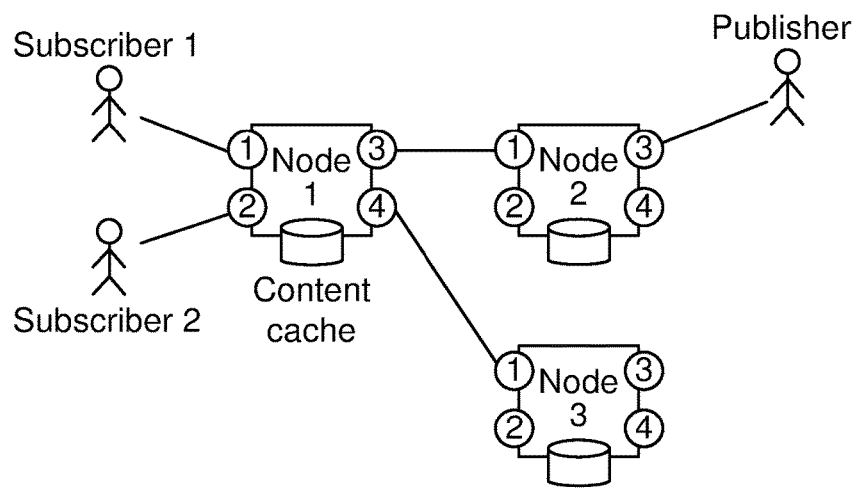
FIG. 1 illustrates a general operating principle of prior art ICN/CCN content delivery.

FIG. 1 shows an ICN-type network, the general principles of which previously have been discussed.

Figure 2:
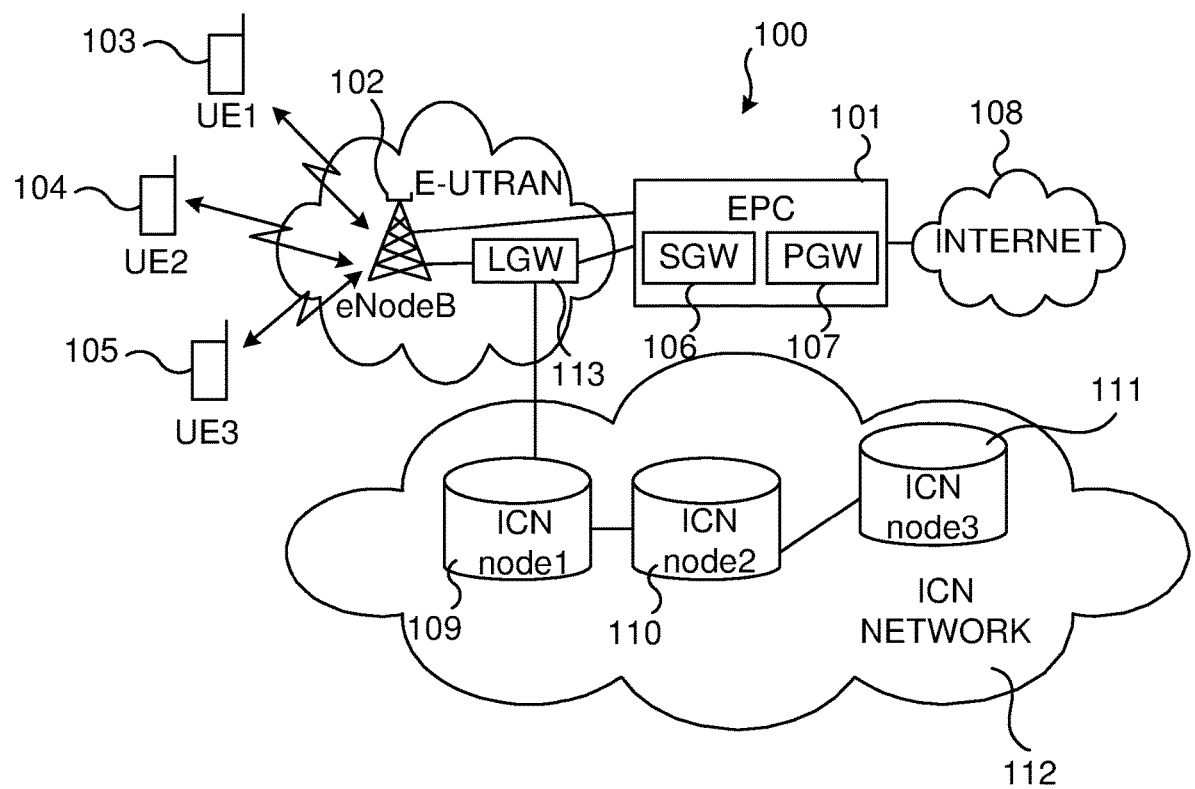
FIG. 2 shows a schematic overview of an exemplifying wireless communication system in which the present invention can be implemented.

FIG. 2 shows a schematic overview of an exemplifying wireless communication system in which the present invention can be implemented.

The wireless communication system 100 is an Long Term Evolution (LTE) based system, where the packet core network 101 is referred as an Evolved Packet Core (EPC) network, even though the invention may be implemented in any wireless system utilizing ICN technology, such as a 5th generation (5G) wireless system.

The wireless communication system 100 comprises at least one radio base station 102 in the form of an eNodeB, which forms the LTE radio access network referred to as Evolved Universal Terrestrial Radio Access Network (E-UTRAN). In practice, a number of eNodeBs together form the E-UTRAN. The eNodeB is a radio access node that interfaces with one or more mobile radio terminals (UEs), in this schematic overview illustrated by a first UE 103, a second UE 104, and a third UE 105.

The eNodeB 102 is operatively connected to a Serving Gateway (SGW) 106 configured to route and forward user data packets, in turn operatively connected to an upstream Packet Data Network Gateway (PGW) 107, which provides connectivity from the UEs to external packet data networks 108, such as the Internet, by being the point of exit and entry of traffic for the UEs.

It should be noted that FIG. 2 is for illustrational purposes only, and that e.g. the EPC network 101 in practice is far more complex with a variety of functional nodes intercommunicating with each other.

Further illustrated in FIG. 2 are a first ICN node 109, a second ICN node 110 and a third ICN node 111 forming an ICN network 112, where the first ICN node 109 may connect downstream to the eNodeB 102 in the E-UTRAN via a so called Local Gateway (LGW) 113, which also connects to the EPC network 101. As previously mentioned, the ICN nodes are essentially switches equipped with large caches for storing much-requested content for rapid delivery upon request.

FIG. 2 functionally illustrates that the ICN nodes are separate from the eNodeB 102. However, one or more of the ICN nodes 109, 110, 111 may even be arranged within eNodeB 102. In any case, the ICN path terminates locally at the eNodeB 102.

Hence, requests (a.k.a. "interests") for popular content from UE1, UE2 and UE3 will be sent to the eNodeB 102, which in its turn will send an upstream request to the first ICN node 109 and if the requested content is not residing in its cache, the request will proceed upstream to the second ICN node 110, and so on.

Once the content has been encountered at one of the nodes, for example at the second ICN node 110, the content will be delivered via the same bi-directional link in a downstream direction via the first ICN node 109 to the eNodeB 102, which in its turn transmits the requested content to a requesting UE or even broadcasts the requested content to a plurality of UEs requesting the same content, for instance in case a number of end-users is watching a live streaming sport event.

Thus, the structure of ICN advantageously allows for more rapid delivery of popular, much-requested content as compared to data request and delivery occurring over the core network 101. It should further be noted that even though content would be requested from a single one of the UEs, and thus not be considered a much-requested piece of content, the fetching and delivery of the requested content via ICN may still be advantageous as compared to fetching and delivering the requested content via e.g. a Content Data Network (CDN), which would require access via the EPC.

However, as previously mentioned, if a node who wishes to publish content on the ICN network 112 is mobile, exemplified e.g. by the first UE 103, problems may arise. For instance, the first UE 103 may send a request to the ICN network 112 that a piece of content is to be published in the ICN network 112 such that any one or both of the second and third UEs 104, 105 may retrieve the published content. However, at this time, the first UE 103 (i.e. the "publisher", cf. FIG. 1) has already moved and cannot be found by the second and third UEs 104, 105 (i.e. the "subscribers", cf. FIG. 1) for retrieving the requested content.

Figure 3:
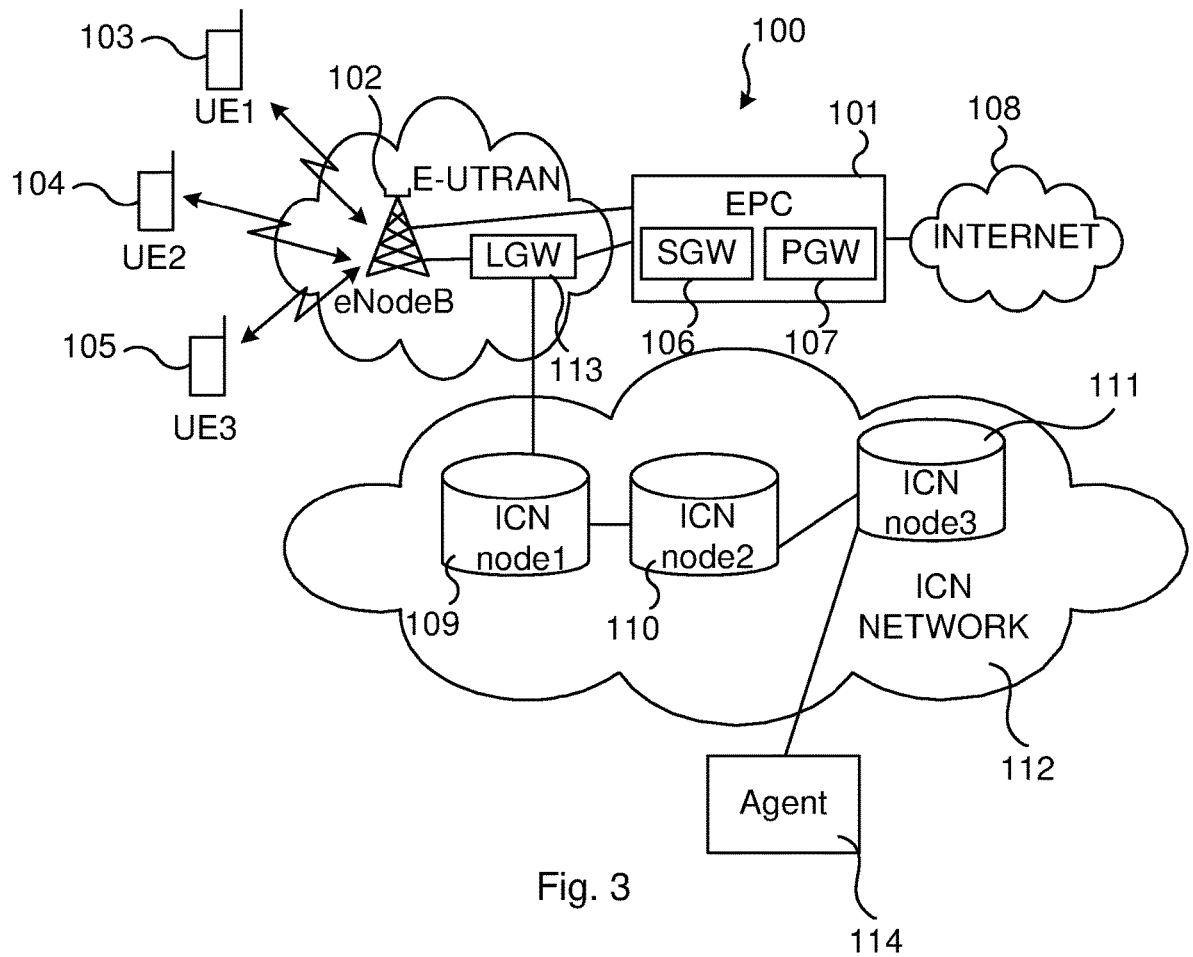
FIG. 3 shows an agent device according to an embodiment implemented in the wireless communication system of FIG. 2.

FIG. 3 illustrates an embodiment of the invention for overcoming this problem, where an agent device 114 is implemented in the ICN network 112 for distributing content to requesting devices 104, 105 on behalf of the publishing device 103. The agent device 114 is a fixed, non-mobile device embodied e.g. by a home computer of the publisher. Advantageously, any request for content provided by the first UE 103 will instead go to the agent device 114.

In one scenario, the publishing device 103 is a 3GPP UE with a subscription at an operator, wherein the operator hosts agents in the network. Another scenario could be that the end-user has its own residential network hosting an agent. The mobile device 103 could be a laptop with a Wi-Fi interface that may attach at home, at a public hot-spot, or any other place.

Figure 4:
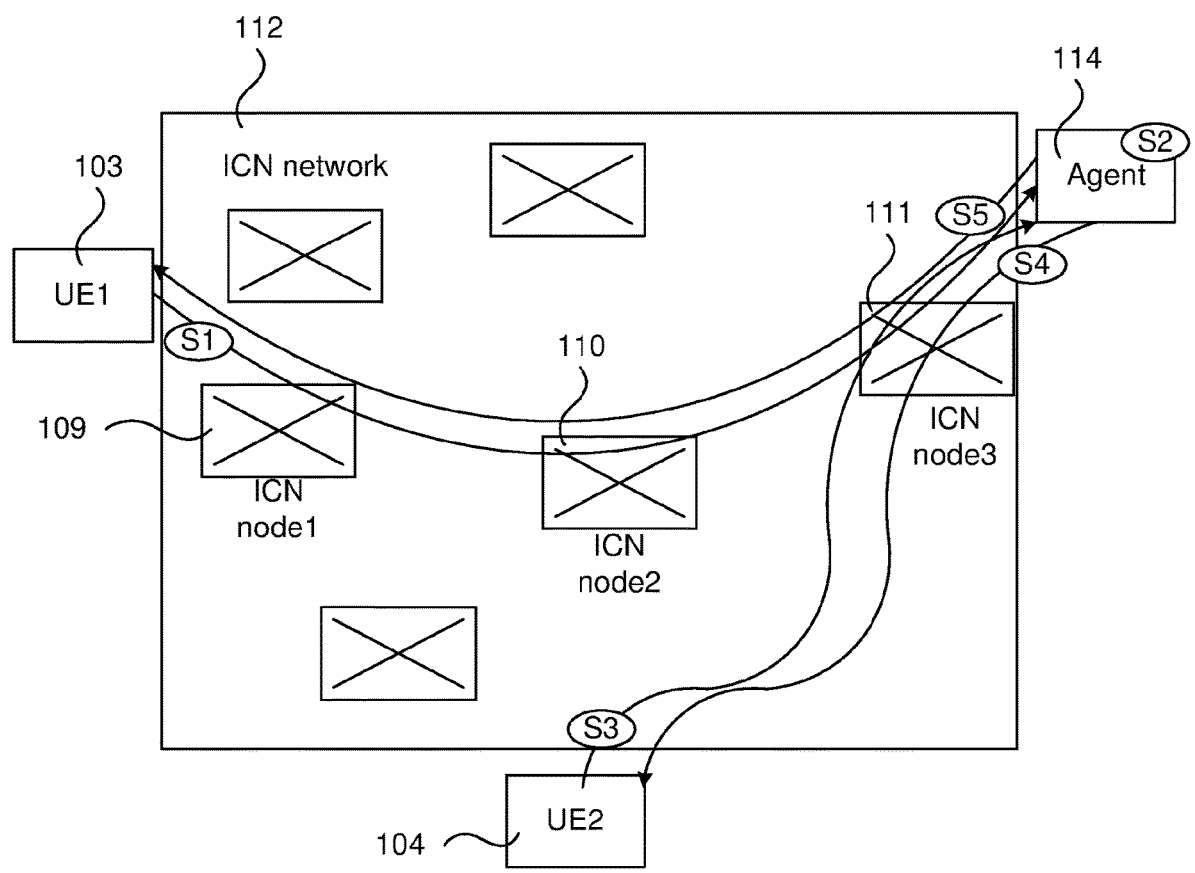
FIG. 4 illustrates a sequence diagram of a method of an embodiment performed at a wireless communication device of distributing data content in an ICN network.

FIG. 4 illustrates a sequence diagram of a method of an embodiment performed at a wireless communication device 103 of distributing data content in an ICN network 112. The publishing device 103 is embodied by the first UE 103, while the requesting device is embodied by the second UE 104. The ICN network 112 comprises a number of ICN nodes; in this particular example, the distribution of content involves three ICN nodes 109, 110, 111.

In this exemplifying embodiment, the first UE 103 is a drone that regularly takes pictures. The agent name of the drone is "/DroneMania/John", where "DroneMania" is a company letting drones and "John" is a renter. Pictures are available under "/DroneMania/John/Time", where "Time" indicates the time the pictures (such as e.g. 14:00) were taken and thus identifies the pictures as well as the request itself. The pictures are subsequently to be made available for request in the ICN network 112 by any requester.

Alternatively, the identifier associated with the first UE 103 used by the agent 144 could e.g. be "/operator/lastname/firstname" or "country/city/street/lastname/firstname" or "company/service". The identifier is unique for the UE 103. An ICN network may contain many agents, and a single wireless device may have multiple such identifiers. Further, multiple agents may use the same identifier for a wireless device.

In a first step S1, a request to distribute the data content (i.e. the pictures taken by the drone) is submitted from the first UE 103 to the Agent 114, which is assigned to distribute the data content on behalf of the first UE 103. This is performed by either using an available ICN interest message, or alternatively by introducing a new type of ICN request message. In the following, the request will be referred to as an "ICN Interest".

The ICN Interest submitted in step S1 comprises an identifier associated with the first UE 103 ("/DroneMania/John"), an identifier of the ICN Interest ("/DroneMania/John/1400"), and the content to be distributed, i.e. the pictures taken by the drone at 14:00.

The parameter "1400" of the ICN Interest can also be used to identify the content, even though it may be envisaged that the agent 114 subsequently uses its own naming upon distributing the pictures to requesting devices. Alternatively, a separate parameter is included in the ICN Interest for identifying the content.

The identifier of the ICN Interest must be configured to enable delivery of the ICN Interest to the agent 114 via the intermediate ICN nodes 109, 110, 111.

That is, the identifier of the ICN Interest must be selected such that the ICN nodes 109, 110, 111 which are traversed before the ICN Interest reaches the agent 114 see a "unique" identifier, i.e. an identifier which is currently not stored in the PIT of the respective traversed ICN node, as the ICN Interest otherwise—due to the nature of the ICN technology—would not be forwarded by the first ICN node holding the identifier in its PIT (and the corresponding content cached in the CS); the first ICN node holding the indicated content would instead reply by sending the requested content downstream to the first UE 103.

Hence, the identifier of the ICN Interest must be selected such that it is ensured that the ICN nodes 109, 110, 111 indeed forward the ICN Interest (and the content) to the agent 114. In one embodiment, a unique identifier is included with the ICN Interest, while in another embodiment a flag is added to the ICN Interest indicating that the ICN Interest should be forwarded all the way to the agent 114.

In an embodiment, an authentication process is optionally undertaken at the agent 114. With reference again to FIG. 4, when the agent 114 receives the ICN Interest submitted by the first UE 103 in step S1, it checks the authenticity of the ICN Interest in step S2. This could, e.g., be achieved by the first UE 103 encrypting the ICN Interest, or a selected part of the ICN Interest, with its private key, such that agent 114 can perform decryption with a public key of the first UE 103, or a shared symmetric secret key is used.

Upon verifying the authenticity of the ICN Interest, the agent 114 extracts the content (i.e. the pictures) from the ICN Interest (which again may involve decryption). The content can thus be made available to a requesting device in the form of the second UE 104.

From this point forward, other devices may retrieve the content using known ICN procedures. In this exemplifying embodiment, the pictures are requested by the second UE 104.

The second UE 104 thus sends an ICN Interest to the agent 114 in step S3 using the name "/DroneMania/John/1400" to identify the pictures.

The agent 114 replies in step S4 with an Object Information message containing the picture(s) taken at 14:00.

Further optionally, to confirm to the first UE 103 that the content indeed has been made available to any requesting devices, the agent 114 sends an acknowledgement in the form of an Information Object back to the first UE 103 in step S5 (i.e. at any point after step S2). According to known ICN procedure, each intermediate ICN node 109, 110, 111 will have the ICN Interest submitted upstream in step 101 in its PIT, and the corresponding content in its CS, resulting in that the acknowledgement sent downstream eventually ends up at the first UE 103. The content of such Information Object would simply be a notification of acknowledgement.

However, if the first UE 103 has moved after the pictures was sent along with the ICN Interest in step S1 to the agent 114, the acknowledging Information Object submitted by the agent 114 in step 105 will not end up at the first UE 103 but simply be discarded by the final downstream ICN node 109. The MD does not receive an acknowledgement, and may after a time period simply re-submit the ICN Interest comprising the pictures to be made available by the agent 114, and a new identifier of the request configured to enable delivery of the request to the agent device 114 via the intermediate ICN nodes 109, 110, 111 of the ICN network 112, for instance "/DroneMania/John/1400:2" indicating that it is a retransmission.

It is necessary to use a new identifier ("/DroneMania/John/1400:2") as the previously sent identifier ("/DroneMania/John/1400") resides in the PIT of the respective ICN node 109, 110, 110, and thus would result in that the corresponding content held in the CS would be returned to the first UE 103.

In an embodiment, the first UE 103 advantageously configures the submitted ICN Interest in step S1 request with a value indicating a time period for which the submitted ICN Interest is valid, thereby facilitating for the intermediate ICN nodes 109, 110, 111 in the ICN network 112 to remove the ICN Interest from their PITs upon expiry of the time period. It may further be envisaged that the time period is dependent, e.g., on the mobility pattern of the first UE 103 and/or expected round-trip between the first UE 103 and the agent 114.

In such a case a re-submitted ICN Interest can be configured to have the same identifier ("1400") as the previously submitted ICN Interest.

In a further embodiment, the ICN Interest submitted by the first UE 103 is advantageously configured with a value indicating a time period for which the content is valid, thereby facilitating for any of the intermediate nodes 109, 110, 111 in the ICN network 112 to discard the content upon expiry of the time period upon receiving such an indication from the agent 114.

Figure 5:
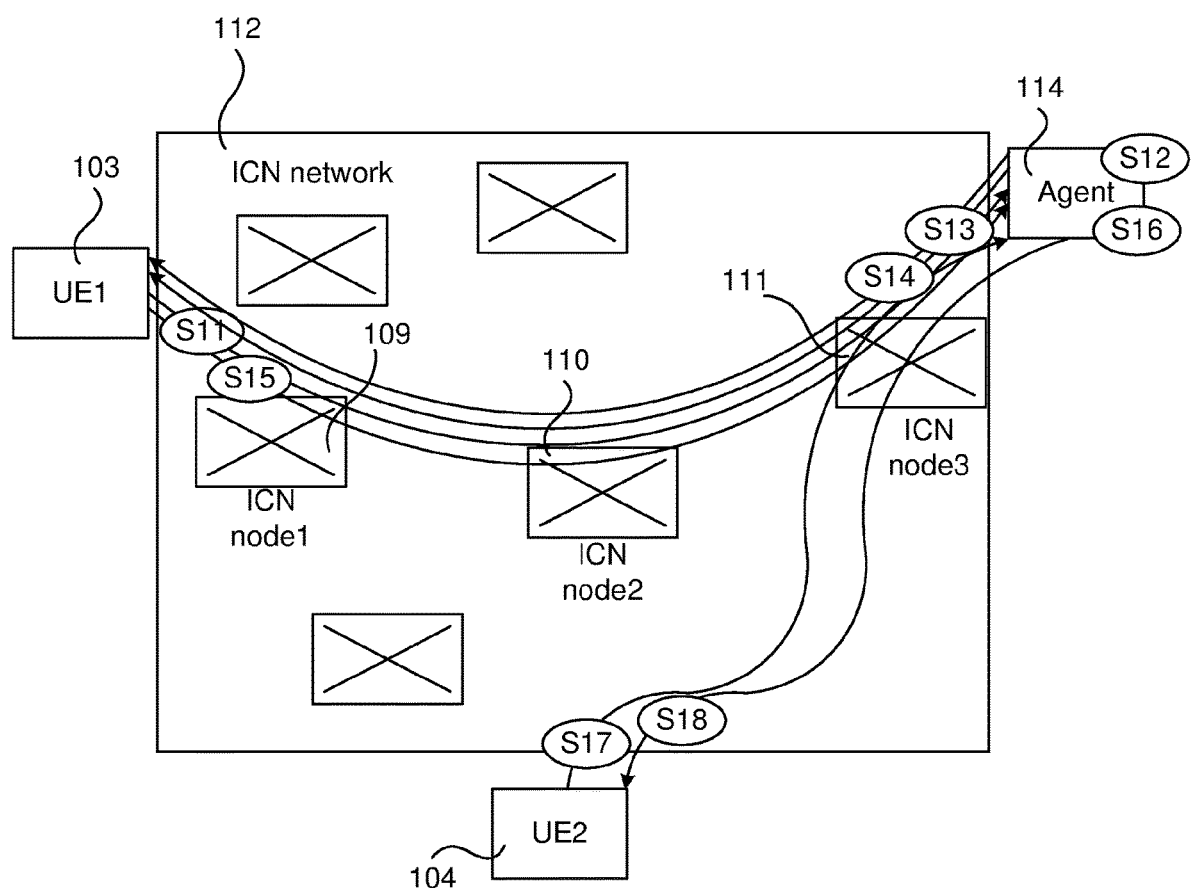
FIG. 5 illustrates a sequence diagram of a method of a further embodiment performed at a wireless communication device of distributing data content in an ICN network.

FIG. 5 illustrates a sequence diagram of a method of another embodiment performed at a wireless communication device 103 of distributing data content in an ICN network 112. The publishing device is again embodied by the first UE 103, while the requesting device is embodied by the second UE 104. The ICN network 112 comprises a number of ICN nodes; in this particular example, the distribution of content involves three intermediate ICN nodes 109, 110, 111.

In this embodiment, it is assumed that the content submitted from the first UE 103 to the agent 114 cannot be carried in an ICN Interest, for instance if ICN Interest would be restricted to a certain maximum size. One way to solve this would be to introduce new types of ICN messages. Another way to solve this will be discussed in the following.

Again, in this exemplifying embodiment, the first UE 103 is a drone that regularly takes pictures. The agent name of the drone is "/DroneMania/John", where "DroneMania" is a company letting drones and "John" is a renter. Pictures are available under "/DroneMania/John/Time", where "Time" indicates the time the pictures (such as e.g. 14:00) were taken and thus identifies the pictures as well as the request itself. The pictures are subsequently to be made available for request in the ICN network 112 by any requester. In a first step S11, a request to distribute the data content (i.e. the pictures taken by the drone) is submitted from the first UE 103 to the Agent 114, which is assigned to distribute the data content on behalf of the first UE 103. In the following, the request will again be referred to as an "ICN Interest".

The ICN Interest submitted in step S11 comprises an identifier associated with the first UE 103 ("/DroneMania/ John"), an identifier of the ICN Interest ("/DroneMania/ John/1400"), and an indication of a current location of the first UE 103. The indication of the current location of the first UE 103 may be more or less detailed, for instance: "/Operator/Europe/Sweden/Stockholm/BaseStation/Cell/ John". The indication of the current location of the first UE 103, which is used by the agent device 114, may change as the UE 193 moves.

In an embodiment, an authentication process is optionally undertaken at the agent 114. With reference again to FIG. 5, when the agent 114 receives the ICN Interest submitted by the first UE 103 in step S11, it checks the authenticity of the ICN Interest in step S12. This could, e.g., be achieved by the first UE 103 encrypting the ICN Interest, or a selected part of the ICN Interest, with its private key, such that agent 114 can perform decryption with a public key of the first UE 103, or a shared symmetric secret key is used.

Upon verifying the authenticity of the ICN Interest, the agent 114 may further in an embodiment send an acknowledgement in the form of an Information Object back to the first UE 103 in step S13.

The agent now knows the location name ("/Operator/ Europe/Sweden/Stockholm/BaseStation/Cell/John") of the first UE 103, and sends an ICN Interest which contains a notification that the first UE 103 can send any content ready for being distributed. This may be just a generic indication, or a more specific indication like the name of the content: "1400".

As in the previous embodiments the agent 114 adds an identifier to the ICN Interest submitted to the first UE 103 in step S14, which identifier is configured to enable delivery of the request from the agent 114 to the first UE 103 via the intermediate ICN nodes 109, 110, 111 of the ICN network 112. The name of this ICN Interest would for instance be the location name of the first UE 103 concatenated with e.g. a random number: "/Operator/Europe/Sweden/Stockholm/ BaseStation/Cell/John/x". As previously discussed, due to the fact that this is the first time this name is used, the ICN Interest will be forwarded by the ICN nodes 109, 110, 111 and eventually end up at the first UE 103.

It is noted that steps S13 and S14 may be combined in a single step.

Similar to the action performed at the agent 114 in step S12, the first UE 103 may authenticate the ICN Interest in step S15 before submitting the content (i.e. pictures) to be distributed by the agent 114.

The agent 114 receives the pictures in step S16 (which again may involve decryption), and the pictures content can thus be made available to a requesting device in the form of the second UE 104.

From this point forward, other devices may retrieve the content using known ICN procedures. In this exemplifying embodiment, the pictures are requested by the second UE 104.

The second UE 104 thus sends an ICN Interest to the agent 114 in step S17 using the name "/DroneMania/John/ 1400" to identify the pictures.

The agent 114 replies in step S18 with an Object Information message containing the picture(s) taken at 14:00.

Further optionally, to confirm to the first UE 103 that the content indeed has been made available to any requesting devices, the agent 114 sends an acknowledgement in the form of an Information Object back to the first UE 103.

However, if the first UE 103 has moved after the ICN Interest was sent in step S11 to the agent 114, or after the agent 114 submitted ICN Interest to the first UE 103 in step S14, the first UE 103 would have to restart the process from step S11 informing of its new location name.

As in previous embodiments, the identifier of the respective ICN Interest must be selected such that it is ensured that the ICN nodes 109, 110, 111 indeed forward the ICN Interest to the agent 114 when the first UE 103 requests publication in step S11, and that it is ensured that the ICN nodes 109, 110, 111 forward the ICN Interest to the first UE 103 when the agent 114 requests to receive the content to be published in step S13/S14.

In one embodiment, a unique identifier is included with the respective ICN Interest, while in another embodiment a flag is added to the respective ICN Interest indicating that the ICN Interest should be forwarded all the way to the agent 114 in one direction and all the way to the first UE 103 in the other.

It is noted that, already in step S15, the first UE 103 can use the object name "/DroneMania/John/1400". This way, the ICN Interest will be cached by the intermediate ICN nodes 109, 110, 111 along the path towards the agent 114, which may improve retrieving by other devices. In particular, in the example above, the submission from the second UE 104 in step S17 does not need to go all the way to the agent 114 as the content is already available in the intermediate ICN node 111 that is passed both in step S15 and in step S17.

To achieve the same result in the embodiment described with reference to FIG. 4, the acknowledging Information Object submitted in step S5 could contain the actual content instead of just a confirmation that the object has been published. It would require more bandwidth to send the content merely to populate the caches, but it does not add to the number of ICN messages submitted, since the acknowledging Information Object message would be sent anyway. In case the size of a piece of content is relatively small, the content may be sent along with the acknowledgement.

As can be concluded from the embodiments discussed with reference to FIG. 5, the agent 114 reveals the current physical location and identity of the first UE 103 to other nodes in the ICN network. In particular, the intermediate ICN nodes 109, 110, 111 between the first UE 103 and the agent 114 will see this location after step S14 has been performed.

This may be a privacy issue if the ICN nodes 109, 110, 111 are managed by an untrusted party. However, in a typical scenario where the mobile device 103 is a UE and the agent 114 is in the UE's operator network 100, there would be no such untrusted parties between the agent 114 and the first UE 103.

The first UE 103 could alternatively use a temporary name received upon attachment to the network 100. Alternatively, a Cell Radio Network Temporary Identifier (C-RNTI) or a SAE-Temporary Mobile Subscriber Identity (S-TMSI), or corresponding identifiers used in future systems, could be used as the first UE identifier in the location name. After attachment, the temporary name may also be updated at regular intervals. So, following the example above, the name would become "/Operator/Europe/Sweden/Stockholm/BaseStation/Cell/abc/x", where "abc" is a temporary name for "John". Yet another variant is that the temporary name is the Internet Protocol (IP) address of the UE. This would only work if the UE is attached to both an ICN network and an IP network.

In the solution above, it is assumed that the ICN network 112 is able to forward messages to the first UE 103 using its location name: "/Operator/Europe/Sweden/Stockholm/BaseStation/Cell/John/x". The first part of the name "/Operator/Europe/Sweden/Stockholm/BaseStation/Cell" can be seen as static and could therefore be pre-configured in the intermediate ICN nodes 109, 110, 111. The last part "/John/x" is a dynamic piece of information that is only available from the time the first UE 103 attaches to the network 100. It could be a temporary name as described above and could even change during the lifetime of the attachment.

One way to configure relevant ICN nodes with this dynamic piece of information would be to provide integration between network control plane terminating the wireless communication device session management requests and the ICN data plane network. For example, as part of the attachment procedure, the temporary name is negotiated between network control plane (e.g. by a Mobility Management Entity (MME) in EPC) and the wireless communication device, and configured into the appropriate data plane ICN nodes.

If the temporary part of the name is the C-RNTI or the S-TMSI, then the ICN nodes do not have to be informed, provided that the ICN node closest to the publishing wireless communication device is integrated in the eNodeB. Then the location name in the example above will point out the cell of the wireless communication device and the C-RNTI tells the eNodeB which UE in the cell that is the publishing UE and should receive any ICN message routed using prefix based routing to the concerned name (i.e., if the C-RNTI is inserted in the above example: "Operator/Europe/Sweden/Stockholm/BaseStation/Cell/C-RNTI/x").

Another way to configure the relevant ICN nodes would be to solely use the data plane. The first UE 103 could publish its local name like in step S16 above. This follows known ICN procedures.

In the above described embodiments, it has been assumed that the first UE 103 knows that name of its agent 114. In some of the embodiments, it has further been assumed that the first UE 103 and its agent 114 have access to information like keying material. One way to achieve is by pre-configuration. Another way is to have the first UE 103 dynamically find its agent 114, and exchange this information.

For example, the agents may publish the particular application(s) and operator(s) for which they can accept content, in the sense that the agents indicate that they represent a certain content name. That is, they act as an agent for a given content.

As an example, the first UE 103 sends an ICN Interest (steps S1 or S11) indicating a purpose ("I want to publish") and the operator used, etc. This may either be an extension of the an available ICN Interest as defined in the art, or a new ICN message. Either way, the message is routed to an appropriate agent 114, based on a configuration of the intermediate ICN nodes 109, 110, 111. The purpose of the message is for the first UE 103 to attain encryption/authentication keys of the agent 114 for secure communication. Optionally, the first UE 103 may piggyback its own keys in this message. The agent 114 may reply with a message containing its keys.

At any point in time, the first UE 103 may want to perform another publication of content. It may have moved since the last publication, and by performing a new key exchange procedure, it may end up at another agent that is now more appropriately placed for the first UE 103.

Figure 6:
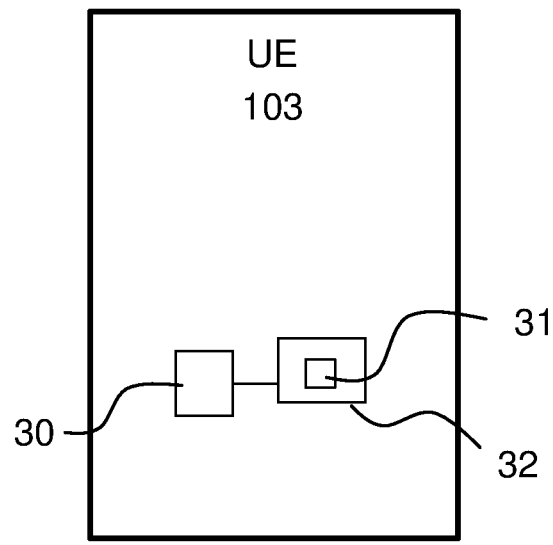
FIG. 6 illustrates a wireless communication device according to an embodiment.
Figure 7:
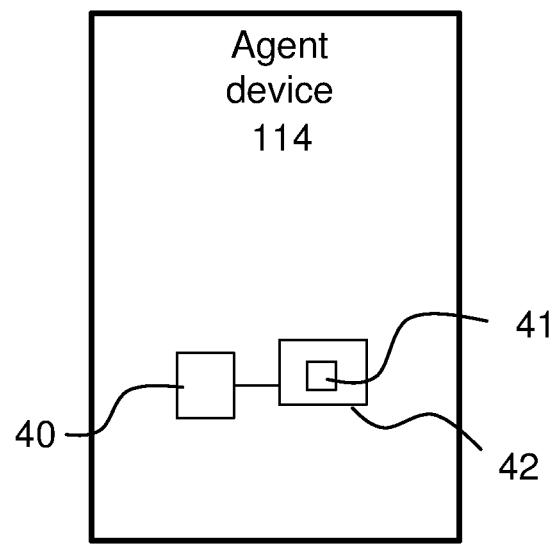
FIG. 7 illustrates an agent device according to an embodiment.

With reference to FIGS. 6 and 7, the steps of the method performed by the first UE 103 and the agent device 114 according to embodiments are in practice performed by a processing unit 30, 40 embodied in the form of one or more microprocessors arranged to execute a computer program 31, 41 downloaded to a suitable storage medium 32, 42 associated with the microprocessor, such as a Random Access Memory (RAM), a Flash memory or a hard disk drive. The respective processing unit 30, 40 is arranged to cause the first UE 103 and the agent device 114 to carry out the method according to embodiments when the appropriate computer program 30, 40 comprising computer-executable instructions is downloaded to the storage medium 32, 42 and executed by the processing unit 30, 40. The storage medium 32, 42 may also be a computer program product comprising the computer program 31, 41. Alternatively, the computer program 31, 41 may be transferred to the storage medium 32, 42 by means of a suitable computer program product, such as a Digital Versatile Disc (DVD) or a memory stick. As a further alternative, the computer program 31, 41 may be downloaded to the storage medium 32, 42 over a network. The processing unit 30, 40 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed at a wireless communication device for distributing data content in an Information Centric Networking, ICN, network, comprising:
submitting a request to distribute the data content to an agent device in the ICN network assigned to distribute the data content on behalf of the wireless communication device, wherein:
the request comprises an identifier associated with the wireless communication device, an identifier of the request configured to enable delivery of the request to the agent device via intermediate ICN nodes of the ICN network, and the data content to be distributed; and
the request indicates to the agent device to deliver the data content to one or more requesting devices without a request for the data content being received by the wireless communication device.

2. The method of claim 1, the request being configured to be an available ICN Interest message or a new specific ICN distribution message.

3. The method of claim 1, the request further comprising an identifier of the data content.

4. The method of claim 1, the identifier of the request being configured to be an identifier not currently stored in any one of the intermediate ICN nodes, or a flag accompanying the request indicating that the request should be forwarded by the intermediate ICN nodes to the agent device.

5. The method of claim 1, further comprising:
receiving an acknowledgement from the agent device that the request has been received.

6. The method of claim 1, further comprising:
re-submitting, in case no acknowledgement is received from the agent device that the request has been received, the request with a new identifier of the request configured to enable delivery of the request to the agent device via the intermediate ICN nodes of the ICN network, and the data content to be distributed.

7. The method of claim 1, further comprising:
configuring the submitted request with a value indicating a time period for which the submitted request is valid, thereby facilitating for the intermediate ICN nodes in the ICN network to remove the request from their Pending Interest Table, PIT, upon expiry of the time period.

8. The method of claim 1, further comprising:
configuring the submitted request with a value indicating a time period for which the data content is valid, thereby facilitating for any of the intermediate ICN nodes in the ICN network to discard the data content upon expiry of the time period.

9. A method performed at a wireless communication device for distributing data content in an Information Centric Networking, ICN, network, comprising:
submitting a request to distribute the data content to an agent device in the ICN network assigned to distribute the data content on behalf of the wireless communication device, wherein:
the request comprises an identifier associated with the wireless communication device, an identifier of the request configured to enable delivery of the request to the agent device via intermediate ICN nodes of the ICN network, and an indication of a current location of the wireless communication device; and
the request indicates to the agent device to deliver the data content to one or more requesting devices without a request for the data content being received by the wireless communication device.

10. The method of claim 9, further comprising:
receiving, from the agent device, a request for the data content to be distributed, the request comprising an identifier configured to enable delivery of the request from the agent device to the wireless communication device via the intermediate ICN nodes of the ICN network; and
submitting, to the agent device, the data content to be distributed.

11. The method of claim 10, further comprising:
verifying authenticity of the received request before submitting the data content to be distributed.

12. The method of claim 9, further comprising:
re-submitting, in case the wireless communication device moves from the location indicated with the request to distribute the data content before the data content indicated in the request has been submitted to the agent device, the request with an updated current location and a new request identifier configured to enable delivery of the request to the agent device via the intermediate ICN nodes of the ICN network.

13. The method of claim 9, the identifier of the request being configured to be an identifier not currently stored in any one of the intermediate ICN nodes, or a flag accompanying the request indicating that the request should be forwarded by the intermediate ICN nodes to the agent device.

14. A wireless communication device configured to distribute data content in an Information Centric Networking, ICN, network, comprising a processing unit and a memory, said memory containing instructions executable by said processing unit, whereby said wireless communication device is operative to:
submit a request to distribute the data content to an agent device in the ICN network assigned to distribute the data content on behalf of the wireless communication device, wherein:
the request comprises an identifier associated with the wireless communication device, an identifier of the request configured to enable delivery of the request to the agent device via intermediate ICN nodes of the ICN network, and the data content to be distributed; and
the request indicates to the agent device to deliver the data content to one or more requesting devices without a request for the data content being received by the wireless communication device.

15. The wireless communication device of claim 14, the request being configured to be an available ICN Interest message or a new specific ICN distribution message.

16. The wireless communication device of claim 14, the request further comprising an identifier of the data content.

17. The wireless communication device of claim 14, the identifier of the request being configured to be an identifier not currently stored in any one of the intermediate ICN nodes, or a flag accompanying the request indicating that the request should be forwarded by the intermediate ICN nodes to the agent device.

18. The wireless communication device of claim 14, further being operative to:

receive an acknowledgement from the agent device that the request has been received.

19. The wireless communication device of claim 14, further being operative to:
re-submit, in case no acknowledgement is received from the agent device that the request has been received, the request with a new identifier of the request configured to enable delivery of the request to the agent device via the intermediate ICN nodes of the ICN network, and the data content to be distributed.

20. The wireless communication device of claim 14, further being operative to:
configure the submitted request with a value indicating a time period for which the submitted request is valid, thereby facilitating for the intermediate ICN nodes in the ICN network to remove the request from their Pending Interest Table, PIT, upon expiry of the time period.

21. The wireless communication device of claim 14, further being operative to:
configure the submitted request with a value indicating a time period for which the data content is valid, thereby facilitating for any of the intermediate ICN nodes in the ICN network to discard the data content upon expiry of the time period.

22. A wireless communication device configured to distribute data content in an Information Centric Networking, ICN, network, comprising a processing unit and a memory, said memory containing instructions executable by said processing unit, whereby said wireless communication device is operative to:
submit a request to distribute the data content to an agent device in the ICN network assigned to distribute the data content on behalf of the wireless communication device, wherein:
the request comprises an identifier associated with the wireless communication device, an identifier of the request configured to enable delivery of the request to the agent device via intermediate ICN nodes of the ICN network, and an indication of a current location of the wireless communication device; and
the request indicates to the agent device to deliver the data content to one or more requesting devices without a request for the data content being received by the wireless communication device.

23. The wireless communication device of claim 22, further being operative to:
receive, from the agent device, a request for the data content to be distributed, the request comprising an identifier configured to enable delivery of the request from the agent device to the wireless communication device via the intermediate ICN nodes of the ICN network; and
submit, to the agent device, the data content to be distributed.

24. The wireless communication device of claim 23, further being operative to:
verify authenticity of the received request before submitting the data content to be distributed.

25. The wireless communication device of claim 22, further being operative to:
re-submit, in case the wireless communication device moves from the location indicated with the request to distribute the data content before the data content indicated in the request has been submitted to the agent device, the request with an updated current location and a new request identifier configured to enable delivery of the request to the agent device via the intermediate ICN nodes of the ICN network.

26. The wireless communication device of claim 22, the identifier of the request being configured to be an identifier not currently stored in any one of the intermediate ICN nodes, or a flag accompanying the request indicating that the request should be forwarded by the intermediate ICN nodes to the agent device.

* * * * *